United States Patent
Sollee et al.

(10) Patent No.: US 6,771,641 B1
(45) Date of Patent: Aug. 3, 2004

(54) DTMF DIGIT COLLECTION AND TRANSPORTATION FOR A PACKET NETWORK

(75) Inventors: Patrick Sollee, Richardson, TX (US); Tahsin Choudhuri, Plano, TX (US); Christopher Haun, Richardson, TX (US); Scott L. Orton, Allen, TX (US); Stephen Whynot, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/459,044

(22) Filed: Dec. 10, 1999

(51) Int. Cl.[7] .............................................. H04L 12/66
(52) U.S. Cl. ...................... 370/356; 370/389; 370/525; 370/526; 379/88.17; 379/418
(58) Field of Search ................................ 370/236, 356, 370/252, 389, 351, 352, 525, 526; 379/88.17, 93.26, 93.27, 418

(56) References Cited

U.S. PATENT DOCUMENTS

| | | | | |
|---|---|---|---|---|
| 6,038,310 A | * | 3/2000 | Hollywood et al. | ........ 379/283 |
| 6,188,760 B1 | * | 2/2001 | Oran et al. | ................... 379/230 |
| 6,240,391 B1 | * | 5/2001 | Ball et al. | .................... 704/270 |

FOREIGN PATENT DOCUMENTS

| | | | | |
|---|---|---|---|---|
| WO | WO 00/33550 | * | 6/2000 | ............ H04M/3/56 |
| WO | WO0077992 A | | 12/2000 | |

OTHER PUBLICATIONS

S. Donovan, M. Cannon: "The SIP INFO Method", Internet draft (draft-ietf-mmusic-sip-info-method-01), IETF, Jun. 1999. Work in progress.*

J. Kuthan: "Sample Uses of SIP INFO with Varying Reliability Needs", Internet draft (draft-kuthan-sip-infopayload-00), IETF, Oct. 1999. Work in progress.*

M. Arano, A. Dugan, I. Elliott, et al.: "Media Gateway Control Protocol (MGCP), Version 1.0" IETF Network Working Group, RFC-2705, Oct. 1999, pps 1–134, XP002167742, pps. 24, 112. Work in progress.

Hamdi, M., et al.: "Voice Service Interworking for PSTN and IP Networks", IEEE Service Center, Piscawatay, N.J., U.S., May 1999, pps. 104–111, XP000830888, ISSN: 0163–6804, p. 108. Work in progress.

Huitema C., et al., "An Architecture for Residential Internet Telephony Service" IEEE Network, IEEE, Inc., New York, U.S., May 1999, pps. 50–56, XP000870631, ISSN: 0890–8044, pps. 55–56. Work in progress.

S. Donovan, M. Cannon: "The SIP INFO Method", Internet draft (draft-ietf-mmusic-sip-info-method-01), IETF, Jun. 1999. Work in progress.

J. Kuthan: "Sample Uses of SIP INFO with Varying Reliability Needs", Internet draft (draft-kuthan-sip-infopayload-00), IETF, Oct. 1999. Work in progress.

* cited by examiner

*Primary Examiner*—Alpus H. Hsu
*Assistant Examiner*—Michael J Molinari
(74) *Attorney, Agent, or Firm*—Haynes and Boone, LLP

(57) ABSTRACT

A system and method is provided for collecting and transporting DTMF digits between two network end points in a packet network in order to preserve the integrity of the DTMF digits. The system and method use a Session Initiation Protocol (SIP), which is currently defined by the standard body of Internet Engineering Task Force. SIP applications utilize certain predetermined messages, such as an INFO message, and templates. DTMF digits can be collected and transported by using the SIP INFO messages. This works especially well for telephony applications which may require mid session signaling.

15 Claims, 4 Drawing Sheets

DTMF DIGIT COLLECTION AND TRANSPORTATION FOR A PACKET NETWORK

BACKGROUND OF THE INVENTION

The present invention relates generally to telecommunication systems, and more particularly, to a system and method for collecting and transporting dual tone multi-frequency ("DTMF") digits through a packet network.

Packet networks are often preferred over traditional circuit-switched communication networks because they provide speed, flexibility and efficiency for data communication. However, much of the hardware equipment currently in existence is designed for the circuit-switched communication networks such as the public switched telephone network ("PSTN"). The coexistence of both types of networks creates many gaps between the technologies. Traditionally, a voice conversation and DTMF digits are transported together over the PSTN through a voice channel. Because the comparatively slow speed of traditional communication technology, the DTMF digits will be well preserved.

DTMF digits are not always well preserved in a high speed packet network. Packet networks compress and embed information into small and numerous packets, and send the packets out with the expectation that all these packets will be appropriately received by another end point and assembled accordingly. However, it is inevitable that some information may not be recoverable by the receiving end point and thus lost in between the two end points. This is especially true when transferring DTMF digits in a voice channel over a packet network. Since a DTMF digit bears information of a relatively small size, it is more likely that the receiving end point cannot assemble packets to obtain a full comprehension of the sent tone.

Therefore, what is needed is a system and method for collecting and transporting DTMF digits over a channel independent of the voice channel in order to preserve the integrity of the DTMF digits.

SUMMARY OF THE INVENTION

A system and method is provided for collecting and transporting DTMF digits between two network end points in a packet network in order to preserve the integrity of the DTMF digits. In one embodiment, the present invention uses a Session Initiation Protocol (SIP), which is currently defined by the standard body of Internet Engineering Task Force. SIP applications are typically used to establish and terminate multimedia sessions and utilize certain predetermined messages, such as an INFO message, and templates. DTMF digits can be collected and transported by using SIP INFO messages. This works especially well for telephony applications which may require mid session signaling.

One embodiment of the present invention has an end point sending collected digits to another end point server directly without the use of any predetermined SIP template.

In another embodiment of the present invention, a first end point sends a template to a second end point to request digit collection. The second end point collects certain number of digits based on the format defined by the received template, and sends the collected digits to the first end point.

DESCRIPTION OF THE PREFERRED EMBODIMENT

In telecommunication applications, many telephony applications require collecting and transporting DTMF digits in the middle of a call session, and the present invention meets such requirement by using Session Initiation Protocol (SIP). SIP is a control protocol for creating, modifying and terminating sessions with one or more participants in a communication network. The following disclosure provides many different embodiments, or examples, for implementing different features of the invention. Techniques and requirements that are only specific to certain embodiments may be imported into other embodiments. Also, specific examples of components, messages, and processes are described to help clarify the invention. These are, of course, merely examples and are not intended to limit the invention from that described in the claims.

Figure 1:
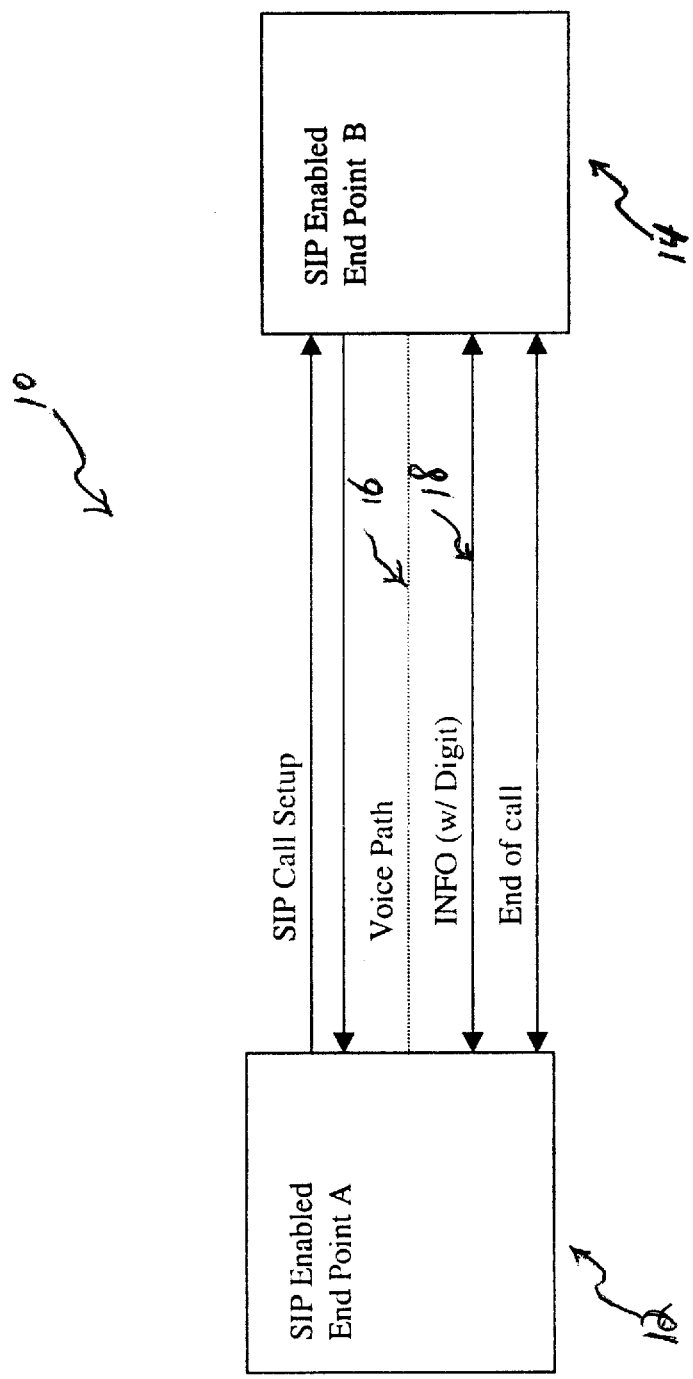
FIG. 1 illustrates a communication network system including two SIP enabled end points that use a communication channel for transporting digits according to one embodiment of the present invention.

Referring now to FIG. 1, a communication network system 10 including two SIP enabled end points is shown. When a SIP enabled end point A 12 initiates a SIP call setup message to be sent to an end point B 14, it starts a call session. Thereafter, other handshake messaging processes are completed to establish a voice path 16. Users at the two end points can then use the voice path 16 for exchanging voice information. Since the voice path is a packet network, voice information is encoded into a series of packets. System error may cause a loss of a small number of such packets in a high speed data exchange, but will not affect the overall quality of the voice information at the receiving end since sufficient information can be extracted from the received packets. While it may be acceptable to occasionally lose packets of voice information, it is often not acceptable to lose DTMF digits. However, collecting and transporting DTMF digits in packet form through the voice path 16 increases the risk of losing the digits.

In response to this problem, the present invention avoids the use of the voice path as a vehicle to transport the DTMF digits. Instead, the DTMF digits are collected and transferred in SIP messages. One such message is a SIP INFO message 18. An INFO message is a standard SIP message. However, in the present embodiment, the INFO message is used to collect and encode DTMF digits. Furthermore, the exchange of DTMF digits using INFO messages can be bidirectional, if needed.

Figure 2:
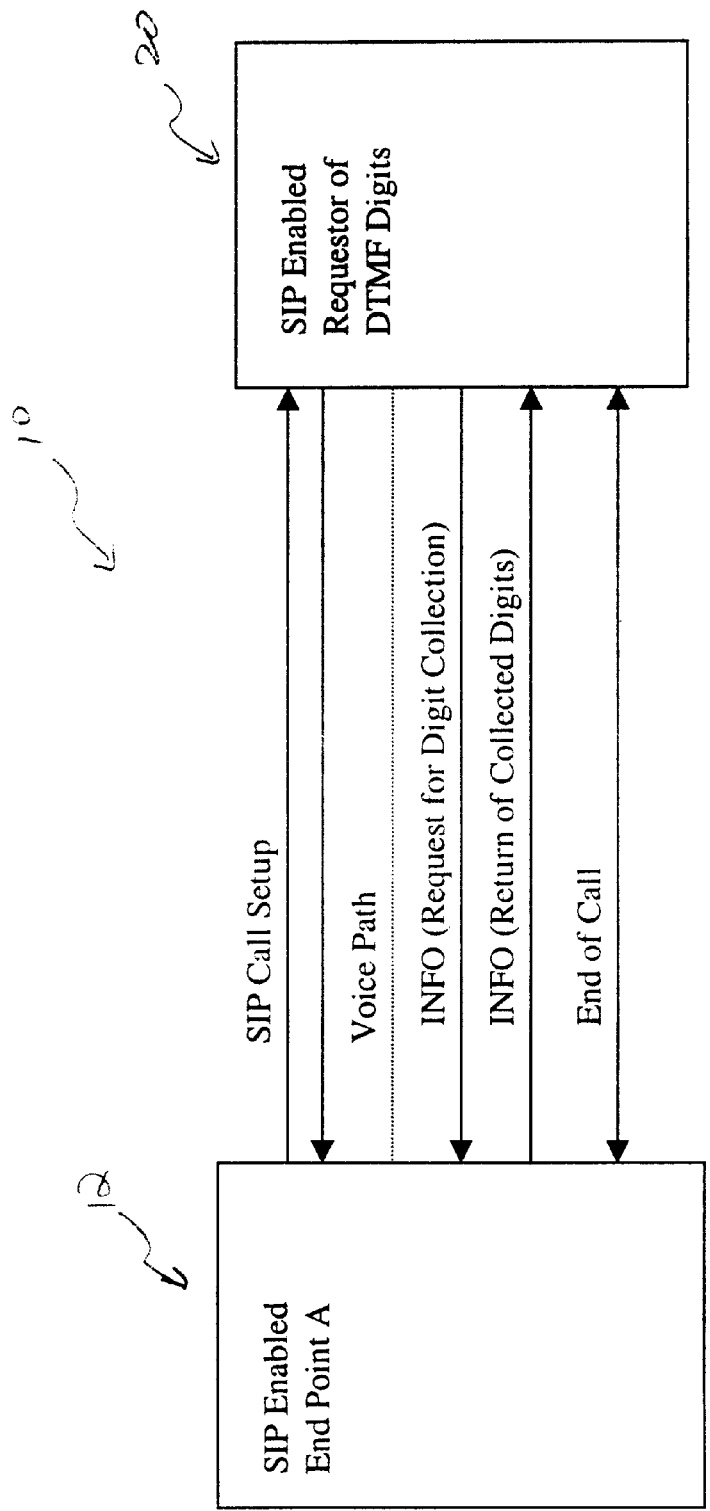
FIG. 2 illustrates a communication network system in accordance with another embodiment of the present invention showing communications exchanged between a SIP enabled end point A and a SIP enabled Requestor.

FIG. 2 illustrates the communication network system 10 in accordance with another embodiment of the present invention showing communications exchanged between a SIP enabled end point A and a SIP enabled Requestor 20. After a SIP call is setup between the end point A and the Requestor, a voice path is established for a call session. Then the Requestor requests the end point A to collect mid session DTMF digits through an INFO message. The end point A collects the digits and sends them back to the Requestor through the INFO message as well. By doing so, the INFO message becomes a communication channel for DTMF digits.

Figure 3:
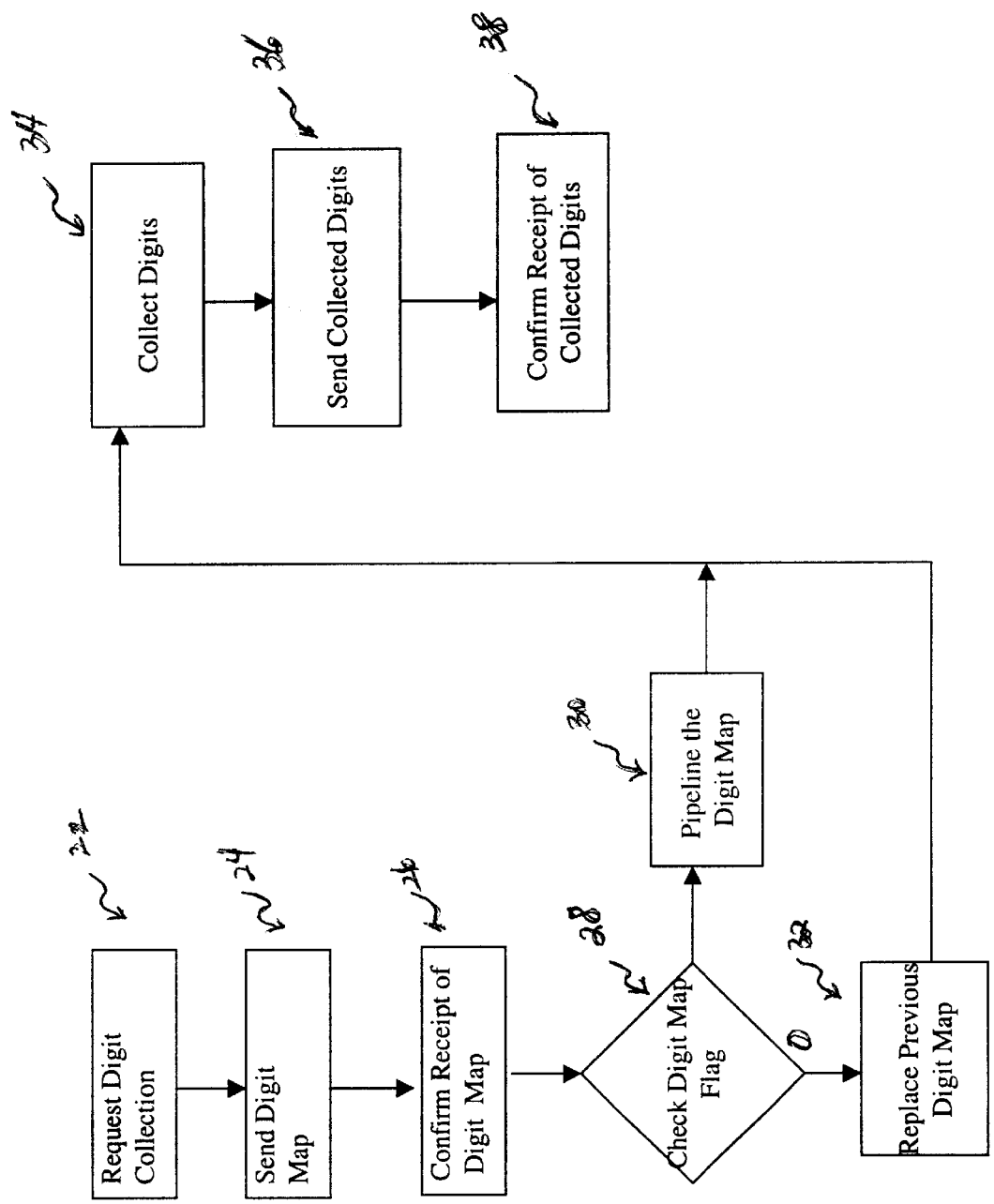
FIG. 3 illustrates a flow diagram showing steps taken by the end point A and the Requestor of FIG. 2 for collecting and transporting mid session DTMF digits.

FIG. 3 illustrates a flow diagram showing steps taken by the end point A and the Requestor of FIG. 2 for collecting and transporting mid session DTMF digits. In step 22, the Requester sends a request for collecting mid session digits through the INFO message. In step 24, a Digit Map template is sent in the request to inform end point A to collect digits according to the instruction and format defined in the Digit Map. Once the Digit Map is received, end point A confirms its receipt through an INFO message in step 26. In step 28, the end point A also checks a Digit Map Flag to see whether the received Digit Map should be stored for future use after the current Digit Map has been processed or used to immediately replace the Digit Map currently being processed.

In one embodiment of the present invention, if the Digit Map Flag equals to 1, then, in step 30, the received Digit Map is stored to be used for collecting digits for the next round, otherwise, in step 32, the received Digit Map will be used immediately in replacement of the Digit Map on hand. Once an appropriate Digit Map is determined, end point A starts to collect mid session DTMF digits in step 34. After the collection is done, the collected digits are sent from end point A to the Requester in another INFO message in step 36. Upon receiving the newly collected digits, the Requestor confirms to end point A of such receipt through an INFO message in step 38.

Figure 4:
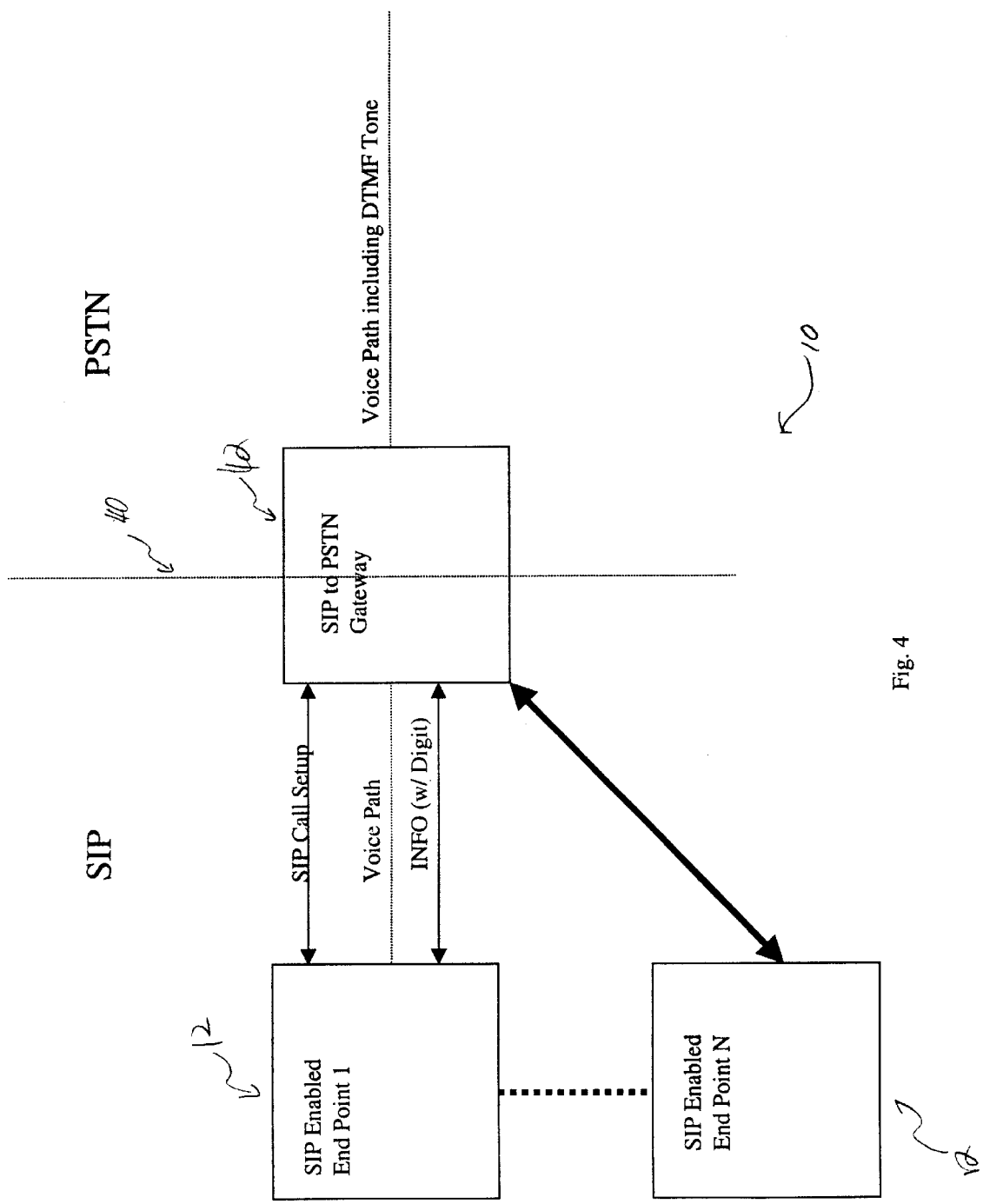
FIG. 4 illustrates a schematic of a communication network system having SIP enabled equipment, traditional PSTN equipment, and a SIP-to-PSTN gateway.

FIG. 4 illustrates a schematic of a communication network system 10 having SIP enabled equipment, traditional PSTN equipment, and a SIP-to-PSTN gateway. Due to the existence of the PSTN equipment, the above described mid session digit collection method through the use of SIP technology must deal with non-SIP enabled PSTN equipment. In FIG. 4, a dotted line 40 artificially indicates a boundary between the SIP enabled portion and the PSTN portion of the communication network 10. A SIP-to-PSTN gateway 42 can be installed to assure smooth data flow between the two portions of the communication network 10. On the SIP side of the network, there are "N" number of SIP enabled end points 12 that can be communicating to the gateway 42 by using the voice channel and the INFO message channel. Once the gateway 42 receives all the collected DTMF digits, it then converts them and further transmits them through traditional PSTN voice path.

For the purpose of describing the present invention, an example set of message syntaxes are defined as follows in one embodiment of the present invention:

The Request message is formatted as specified in SIP RFC 2543 standard:

```
Request = Request-Line
    *( general-header
    | request-header
    | Content-Encoding
    | Content-Length
    | Content-Type)
    CRLF
    [ message-body ]
``` wherein Request-Line=Method SP Request-URI SP SIP-Version CRLF;

Method="INFO"
Content-Type=("Content-Type"|"c")":" media-type
media-type="application/vnd.nortelnetworks.digits"

message-body=Package-Name CRLF Package-Type CRLF
Package-Body CRLF
Package-Name=("Package-Name"|"p")"=" Pkg-Name
Pkg-Name=("Digit-Collection"|token)
Package-Type=("Package-Type"|"y")"=" Pkg-Type
Pkg-Type=("DigitMap"|"Digits"|"Cancel")
Package-Body=(Digitmap-Body|Digits-Body)

The Package-Name parameter provides a frame work to define different packages, therefore it is easy to add new types of information if needed, which makes the frame work extensible. The Digit-Collection package includes three kinds of package types: (1) the DigitMap package type may include a Digitmap-Body; (2) the Digits package type may include a Digits-Body; and (3) the Cancel package type includes no Package-Body.

The Digitmap-Body in the DigitMap message is a template for the digit collection. In the template, it specifies instructions and formats for the digit collection. The Digitmap-Body is sent by a Requestor in an INFO message with the Package-Type defined as DigitMap before any digits are collected. Upon receiving this message, a receiver such as the end point A in FIG. 2 should respond with a 200 OK message to confirm the receipt of the same and start collecting digits according to the Digitmap-Body (i.e., the template). Once collection is complete, end point A sends an INFO message having Digits as the Package-Type and with the Digits-Body containing the collected digits.

A valid Digitmap-Body includes one or more of the following fields that can be specified in any order:

| Digitmap-Body = | Min-Digits CRLF |
| --- | --- |
| | Max-Digits CRLF |
| | Inter-Digit-Timer CRLF |
| | Last-Digit-Timer CRLF |
| | Total-Timeout CRLF |
| | Termination-Key-Flag CRLF |
| | Termination-Key CRLF |
| | Repeat-Count CRLF |
| | Override CRLF |
| | Digit-Map-Association CRLF |

Inside the Digitmap-Body, the Min-Digits parameter defines the minimum number of digits to be collected. The Max-Digits parameter defines the maximum number of digits to be collected. The Termination-Key is not counted as either in the Min-Digits or the Max-Digits. The Inter-Digit-Timer parameter defines the maximum time that the system waits for the user between two key entries. The Last-Digit-Timer parameter defines the maximum time that the system waits for the user between two key entries. The Inter-Digit-Timer restarts after each key entry until the minimum number of digits (Min-Digits) have been collected, and the Last-Digit-Timer restarts after each key entry after the minimum number of digits (Min-Digits) have been collected. The value of both parameters may be specified in milliseconds. Further, the Total-Timeout parameter defines the total time that the system waits for a Max-Digits number of digits to be entered by a user. This timer is started when the digit collection process begins.

In addition, the Termination-Key-Flag defines a boolean flag that determines whether the Termination-Key should be included at the end of digit-string in the Digits-body. This flag value is specified as 1 (true) or 0 (false). If the flag is set to true and the user enters the Termination-Key, then the Termination-Key is appended at the end of digit-string.

Otherwise, it is disregarded. The Termination-Key parameter specifies a specific key that the user enters to terminate the digit stream. Common Termination-Keys include the "#" or the "*".

Since a Digit Map can be reused, the Repeat-Count parameter defines the additional number of times the current Digit Map will be used after it has been used once. A repeat count value of 0 indicates no repetition after the digit collection has been performed once. A repeat count value of 1 indicates one additional collection need to be performed after an initial digit collection has been performed, resulting in a total of two (2) collections. The Override parameter indicates whether the Digit Map contained in the message should replace the current Digit Map or to be stored to a list of Digit Maps. The Override value is specified as either 1 (replace) or 0 (stored). A request to replace the existing Digit Map will be accepted only when no digit collection is in progress thus avoiding any interruption of active digit collection.

The Digit-Map-Association field is used to tag the DigitMap message with a unique ID. Upon completion of the digit collection, the end point A may include the Digit-Map-Association ID from the DigitMap message to the Digits message. This allows the Requestor to synchronize Digit Maps with Digit messages it receives.

In a message of Digits Package type, the Digits-Body contains the digits a user has entered along with some additional information about those digits. A valid Digits-Body includes one or more of the following fields that can be specified in any order:

| | |
|---|---|
| Digits-Body = | Digit-String CRLF |
| | Termination-Key CRLF |
| | Termination-Key-Flag CRLF |
| | Playback-Tone-Duration CRLF |
| | Playback-Inter-Digit-Timer CRLF |
| | Digit-Status CRLF |
| | Digit-Map-Association CRLF |

Inside the Digits-Body, the Digit-String parameter holds the DTMF digits collected from the user. The Termination-Key-Flag tells whether the Digit-String field contains a termination key. A "0" indicates the termination key is not included, while a "1" indicates that it is included. Similar to the DigitMap Package type, the Termination-Key specifies a key that the user can enter to terminate a digit stream. The Playback-Tone-Duration parameter tells the recipient how long (in milliseconds) to pulse the tone of each digit. And the Playback-Inter-Digit-Timer parameter tells the recipient how long (in milliseconds) to pause between pulsing two digits.

Further, the Digit-Status field returns one of predefined labels describing the status of the message. The supported Digit-Status values are as follows:

"success"—signifies that the Digit-String contains information that meets the requirements of the previously received DigitMap request.

"inter-digit-timer-exp"—signifies that the Digit-String of the Digits message is not complete, as the Inter-Digit-Timer has expired before the minimum number of digits were entered.

"last-digit-timer-exp"—signifies that the Last-Digit-Timer has expired and the application now has to determine the validity of the Digit-String as it may or may not be complete.

"total-timer-exp"—signifies that the Total-Timer has expired and the application now has to determine the validity of the Digit-String as it may or may not be complete.

"unsolicited-digits"—signifies that the message was unsolicited (i.e., not resulting from a Digit Map request)

Similar to the DigitMap Package type, the Digit-Map-Association field is used to tag the Digits message with a unique ID.

Another type of message is a Cancel message, which is sent by the Requester to indicate that it would like to cancel the previous Digit Map message already sent. Immediately after receiving a Cancel message, the end point A cancels all pending digit collections based on the specified Digit Maps received earlier and stops the process of collecting any digits. Upon receiving this message, the client should respond with a 200 OK, to confirm the receipt of this Cancel message.

For clearly explaining the details of the present invention, a sample is given below to illustrate the communication between the Requester and the SIP enabled end point A.

Assuming that the Requester requests an account number from end point A, and the number is between 5 to 7 digits. It is to be terminated with a "#" which may be included in the digit message. Inter-Digit-Timer is set at 5 seconds, the Last-Digit-Timer is set at 4 seconds, and the Total-Timer is set to 45 seconds. For the sample shown below, the term "Client" is referred to the end point A.

First, the Requester sends a DigitMap request to the Client using SIP INFO message. The message body is shown as follows:

INFO sip:Client@47.161.18.26:5060 SIP/2.0

Via: SIP/2.0/UDP 47.161.18.122

To: sip:Client@nortelnetworks.com;tag=615145584

From: sip:Requester@nortelnetworks.com

Call-ID: 1246884437@nortelnetworks.com

CSeq: 2INFO

Content-Type: application/vnd.nortelnetworks.digits

Content-Length: 75 p=Digit-Collection y=DigitMap m=5 n=7 i=5000 l=4000 t=45000 k=# f=1 r=0 o=0 a=3452985896

Then, end point A confirms the receipt of the DigitMap message by a 200 OK message as shown below:

SIP/2.0 200 OK

Via: SIP/2.0/UDP 47.161.18.122

To: sip:Client@nortelnetworks.com;tag=615145584

From: sip:Requester@nortelnetworks.com

Call-ID: 1246884437@nortelnetworks.com

CSeq: 2 INFO

Content-Length: 0

Next, the Client will collect digits based on the received Digit Map. Upon completion of a successful digit collection, the Client sends a Digits message to the Requester containing the collected digits. The message reads as follows:

INFO sip:Requester@47.161.18.26:5060 SIP/2.0
Via: SIP/2.0/UDP 47.161.18.122
To: sip:Requester@nortelnetworks.com;tag=615145584
From: sip:Client@nortelnetworks.com
Call-ID: 1246884437@nortelnetworks.com
CSeq: 3 INFO
Content-Type: application/vnd.nortelnetworks.digits
Content-Length: 55
p=Digit-Collection
y=Digits
d=123456#
f=#
s=success
a=3452985896

The following INFO message would be sent from end point A to the Requester in the event that the Inter-Digit-Timer expires before the minimum number of digits have been collected.

INFO sip:Requester@nortelnetworks.com:5060 SIP/2.0
Via: SIP/2.0/UDP 47.161.18.122
To: sip:Requester@nortelnetworks.com;tag=615145584
From: sip:Client@nortelnetworks.com
Call-ID: 1246884437@nortelnetworks.com
CSeq: 3 INFO
Content-Type: application/vnd.nortelnetworks.digits
Content-Length: 57
p=Digit-Collection
y=Digits
d=123
s=inter-digit-timer-exp
a=3452985896

Immediately thereafter, the Requester confirms the receipt of Digits message with the following message:

SIP/2.0 200 OK
Via: SIP/2.0/UDP 47.161.18.122
To: sip:Client@nortelnetworks.com;tag=615145584
From: sip:Requester@nortelnetworks
Call-ID: 1246884437@nortelnetworks.com
CSeq: 3 INFO
Content-Length: 0

In order to cancel digit collection, the Requester sends the following message to cancel the Digit Map:

INFO sip: Client@47.161.18.26:5060 SIP/2.0
Via: SIP/2.0/UDP 47.161.18.122
To: sip:Client@nortelnetworks.com;tag=615145584
From: sip:Requester@nortelnetworks.com.com
Call-ID: 1246884437@nortelnetworks.com
CSeq: 3 INFO
Content-Type: application/vnd.nortelnetworks.digits
Content-Length: 30
p=Digit-Collection
y=Cancel whereas end point A confirms the receipt of the Cancel message with the following message:

SIP/2.0 200 OK
Via: SIP/2.0/UDP 47.161.18.122
To: sip:Client@nortelnetworks.com;tag=615145584
From: sip:Requester@nortelnetworks
Call-ID: 1246884437@nortelnetworks.com
CSeq: 3 INFO
Content-Length: 0

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for collecting and transporting one or more mid session digits through a packet communication channel between a first end point and a second end point in a telecommunication system, the method comprising the steps of:
    sending a request for collecting the mid session digits from the first end point to the second end point;
    defining a template to include a field-based format, one or more quantities of digits to be collected, and one or more timeout values;
    providing the template by the first end point to the second end point including digit collection format and instructions;
    determining an immediate use of a digit map in the template for the digit collection, wherein the determining comprises selecting, based on a criterion, one of:
        storing the digit map for a next round of digit collection, and
        replacing any existing digit map received by the second end point;
    collecting the mid session digits by the second end point according to the digit collection format and instructions provided in the template; and
    sending the collected mid session digits from the second end point to the first end point, wherein all the above communications between the first and the second end points are through one or more INFO messages conforming to a Session Initiation Protocol (SIP).

2. The method of claim 1 further comprising a step of confirming the receipt of the template by sending an INFO message from the second end point to the first end point.

3. The method of claim 1 further comprising a step of confirming the receipt of the collected digits by an INFO message from the first end point to the second end point.

4. The method of claim 1 further comprising the steps of: converting the collected digits into a format acceptable for transmission in a predetermined communication channel not configured for the SIP standard.

5. The method of claim 1 further comprising a step of sending a cancel message in an INFO message to terminate any active digit collection.

6. A method for collecting and transporting one or more mid session digits through a packet communication channel between a first and a second end points in a telecommunication system, the method comprising the steps of:
    sending a request for collecting the mid session digits from the first end point to the second end point;
    defining a template to include a field-based format, one or more quantities of digits to be collected, and one or more timeout values;
    providing the template by the first end point to the second end point including digit collection formats and instructions;
    confirming the receipt of the template by the second end point;

determining an immediate use of a digit map in the template for the digit collection, wherein determining comprises selecting, based on a criterion, one of:
storing the digit map for a next round of digit collection, and
replacing any existing digit map received by the second end point;
collecting the mid session digits by the second end point according to the digit collection format and instructions provided in the template;
sending the collected mid session digits from the second end point to the first end point; and
confirming the receipt of the collected digits by the first end point, wherein all the above communications between the first and the second end points are through one or more INFO messages conforming to a Session Initiation Protocol (SIP).

7. A system for collecting and transporting one or more mid session digits through a packet communication channel between a first and a second end points in a telecommunication system, the system comprising:
a first subsystem for collecting the mid session digits sent from the first end point to the second end point;
a template including digit collection format and instructions, wherein the template comprises:
a field-based format;
one or more quantities of digits to be collected; and
one or more timeout values;
a second subsystem for collecting the mid session digits by the second end point according to the digit collection format and instructions provided in the template;
a third subsystem for sending the collected mid session digits from the second end point to the first end point, wherein both the first and the second end points are configured for applications using a Session Initiation Protocol (SIP) and all communications between the two end points are through one or more INFO messages conforming to the SIP standard; and
a fourth subsystem for determining an immediate use of a digit map in the template for the digit collection, wherein the determining the immediate use comprises selecting based on a criterion, one of:
storing the digit map for a next round of digit collection, and
replacing any existing digit map received by the second end point.

8. The system of claim 7 further comprising a fifth subsystem for confirming the receipt of the template by the second end point.

9. The system of claim 7 further comprising a fifth subsystem for confirming the receipt of the collected digits by the first end point.

10. The system of claim 7 further comprising a fifth subsystem for converting the collected digits in the INFO message into a format acceptable for transmission in a predetermined communication channel not configured for the SIP standard.

11. The system of claim 7 further comprising a fifth subsystem for sending a cancel message in an INFO message to terminate any active digit collection.

12. A system for collecting and transporting one or more mid session digits through a packet communication channel between a first and a second end points in a telecommunication system, the system comprising:
a request message for collecting the mid session digits sent from the first end point to the second end point;
a template including digit collection formats and instructions, wherein the template comprises:
a field-based format;
one or more quantities of digits to be collected; and
one or more timeout values;
means for confirming the receipt of the template by the second end point;
means for determining an immediate use of a digit map in the template for the digit collection, wherein the means for determining comprises means for selecting, based on a criterion, one of:
storing the digit map for a next round of digit collection, and
replacing any existing digit map received by the second end point;
means for collecting the mid session digits by the second end point according to the digit collection format and instructions provided in the template;
means for sending the collected mid session digits from the second end point to the first end point; and
means for confirming the receipt of the collected digits by the first end point, wherein both the first and the second end points are configured for applications using a Session Initiation Protocol (SIP) and all communications between the first and the second end points are through one or more INFO messages defined by the SIP.

13. A method for using at least one digit map to facilitate communications between first and second points, the method comprising:
receiving a first digit map sent by the first point to the second point;
checking a flag associated with the first digit map to determine if the first digit map is to be used for collecting a next set of digits or is to be stored for later use;
storing the first digit map for later use if so indicated by the flag;
collecting the next set of digits using either the first digit map or, if the first digit map is stored, using a previous digit map; and
sending the collected digits from the second point to the first point.

14. The method of claim 13 wherein using the first digit map for collecting the next set of digits includes replacing the previous digit map.

15. The method of claim 13 wherein storing the first digit map for later use includes identifying a time in which the first digit map is to be used.

* * * * *